(12) United States Patent
Chiang

(10) Patent No.: US 7,372,179 B2
(45) Date of Patent: May 13, 2008

(54) STEPPER MOTOR HAVING SOLENOID COILS AROUND END PORTIONS OF STATOR POLES

(76) Inventor: Lee Chung Chiang, 6F-7, No. 8, Sec. 1, Chung-Hsing Rd., Wuku Hsiang, Taipei Hsien (TW) 248

( * ) Notice: Subject to any disclaimer, the term of this patent is extended or adjusted under 35 U.S.C. 154(b) by 355 days.

(21) Appl. No.: 11/299,415

(22) Filed: Dec. 10, 2005

(65) Prior Publication Data

US 2007/0132322 A1 Jun. 14, 2007

(51) Int. Cl.
  *H02K 37/12* (2006.01)
  *H02K 37/16* (2006.01)
  *H02K 1/14* (2006.01)
(52) U.S. Cl. .................................. 310/49 R
(58) Field of Classification Search .............. 310/49 R, 310/179, 184, 185, 216, 254, 40 MM
  See application file for complete search history.

(56) References Cited

U.S. PATENT DOCUMENTS

| 4,371,821 | A | * | 2/1983 | Laesser et al. | 318/696 |
| 4,546,278 | A | * | 10/1985 | Xuan | 310/49 R |
| 4,782,353 | A | * | 11/1988 | Ogihara et al. | 396/463 |
| 5,521,451 | A | * | 5/1996 | Oudet et al. | 310/266 |
| 5,880,551 | A | * | 3/1999 | Prudham | 310/254 |
| 5,959,378 | A | * | 9/1999 | Stechmann | 310/49 R |
| 5,969,444 | A | * | 10/1999 | Kamitani | 310/49 R |
| 6,043,574 | A | * | 3/2000 | Prudham | 310/49 R |
| 6,670,731 | B2 | * | 12/2003 | Kotani et al. | 310/49 R |
| 6,900,574 | B2 | * | 5/2005 | Takemoto et al. | 310/254 |

FOREIGN PATENT DOCUMENTS

GB 2026780 A * 2/1980
JP 04248359 A * 9/1992

* cited by examiner

*Primary Examiner*—Tran Nguyen

(57) ABSTRACT

A stepper motor includes a rotor having a ring-shaped body having a circumference along which a plurality of magnetic poles of alternates. A plurality of stator members is arranged along and spaced from the circumference of the rotor. Each stator member has two limbs circumferentially spaced from each other by an angular range corresponding to an odd number of the magnetic poles of the rotor. A coil winding is formed around an end portion of each limb of each stator member and is substantially flush with the end face of the end portion to reduce and minimize magnetic loss. The stepper motor further includes a circuit board to which the coil windings are electrically connected whereby the phase switching sequences of the stator members and the windings is controlled.

5 Claims, 7 Drawing Sheets

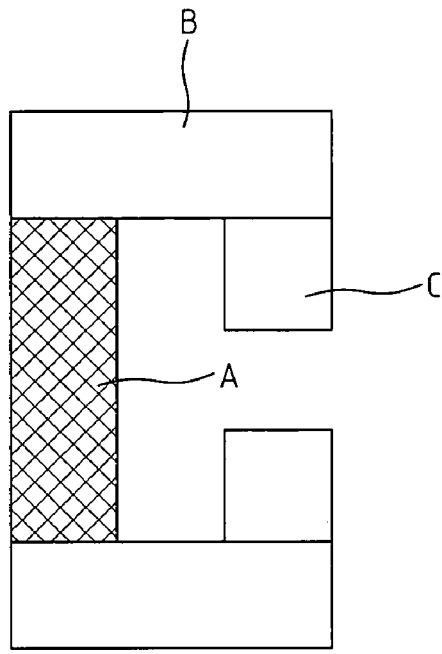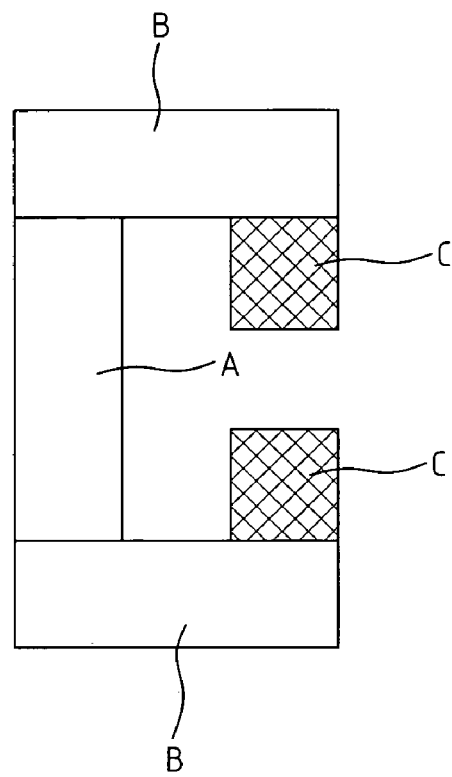
FIG. 4  FIG. 5

STEPPER MOTOR HAVING SOLENOID COILS AROUND END PORTIONS OF STATOR POLES

BACKGROUND OF THE INVENTION

1. Field of the Invention

The present invention relates to a stepper motor having solenoid coils around end portions of stator poles, and in particular to a stepper motor construction that has solenoid coils axially mounted on two ends of the stator yoke to strengthen the magnetic flux intensity.

2. The Related Art

A stepper motor converts electric pulses into incremental mechanical motion. Because of the precision control of machine operation, the stepper motor has wide industrial applications.

FIG. 1 of the attached drawings illustrates a known stepper motor, which comprises a rotor 2 with N pairs of poles on a radially disposed permanent magnet from the core, at least two W-shaped yokes 11, 12 encompassing the rotor 2, each of which has a coil winding 110/120 axially wound around a central strut 111/121. The central strut 111 is equal distance from pole shoes 112, 113, and the central strut 121 is equal distance from pole shoes 122, 123, forming stator pole groups.

When the coil winding 110 is energized, electrical current flows through the coil wound around the central strut 111 to produce a N pole, and the magnetic flux cuts through two adjacent shoes 112, 113 on the silicon steel yoke 11 to give two S poles. These stator poles attract respective poles on the rotor 2 to hold the rotor in step position. However, when the direction of current flow through the coil is changed, the central strut 111 becomes S Pole, and the pole shoes 112, 113 become N poles, so the previously attracted poles of the rotor 2 are now repelled. The coil windings 110, 120 are energized in accordance with a phase switching sequence. This switching magnetic field therefore produces a movement force to propel the rotor 2 into rotation.

The pole group on the yoke 11/12 is to be matched by respective pole group on the rotor 2, which means the rotor pole group has to be within the reaction area to attract or repel respective pole group on the rotor 2. It shall be noted that the divided members of the pole groups on the rotor 2 are separated by a step angle.

When the central strut 111 on the yoke 11 is attracted by respective pole on the rotor 2, two adjacent poles 112, 113 on the right and left sides of the central strut 111 are also lined up with respective poles on the rotor 2 having opposite polarity.

When the rotor 2 is held in step position, the central strut 111 and two pole shoes 112, 113 on the yoke 11 are respectively attracted to poles on the rotor 2, and at the same time, the central strut 121 and two pole shoes 122, 123 on the yoke 12 are not aligned with any rotor pole, because the pole groups are offset by control buffers of appropriate magnetic pole pitch.

Referring to FIG. 2 of the attached drawings, an ideal path of a magnetic flux through the rotor 2 and yoke 11 is shown. The ideal magnetic flux indicated by the bold broken line begins from one end of the central strut 111 crossing the air gap to an opposing pole on the rotor 2, and then passing to an adjacent pole of opposite polarity before turning back to pole shoe 112/113 on the yoke 11, and then cutting through the yoke 11 to return to the central strut 111 from the other end, thus completing the magnetic flux into a closed loop. Since a large part of the magnetic flux travels through magnetic material and encircles with smaller radius, the distribution of magnetic flux encounters low magnetic reluctance, thus avoiding magnetic loss or magnetic flux leakage. Magnetic reluctance is related to resistance encountered in the magnetic flux distribution.

Again referring to FIG. 2, the actual distribution of a typical magnetic flux through the rotor 2 and yoke 11 is shown by the dotted line. The distribution path starts from one end of the central strut 111 same as that in the previous example, cutting across to an opposing pole on the rotor 2, and then passing through an adjacent pole of opposite polarity, and then turning around to a pole shoe 112/113 on the yoke 11, and then passing through the air gap before returning to the central strut 111 from the other end. Since the magnetic flux is distributed in a radial pattern from the central strut, and the two adjacent pole shoes are bare iron, a large part of the magnetic flux is distributed through the air media, not the magnetic material (solenoid coils and yoke), so the magnetic field strength is considerably weakened in the last part of the distribution.

Furthermore, because of the distance between the central strut 111 and the pole shoes 112, 113 on two sides, when the magnetic flux circles around the pole shoe 112/113 beyond the perimeter of the yoke, the magnetic field strength is drastically lessened.

For an ideal motor design, the structure of the circumferential stators shall be strong enough to protect the inside components, but the current designs often have 1 cm lamination on the stator yoke, and the distance between the central strut 111 and the two pole shoes 112, 113 are reduced to 2-4 mm. In such situation, to have more than one hundred turns of coil wound around the central strut, high level skill on the part of the assembly workers is required. This stepper motor construction is therefore not suited for miniature motors, and the yield rate is hardly improved using the labor-intensive winding process.

Referring to FIG. 3, another conventional stepper motor of the prior art has a rotor 3 having multiple poles and two yokes 41, 42 on the circumference. The first yoke 41 on the circumference has two end portions 411, 412 to give a pole pair, and the two poles 411, 412 are connected by a coil winding 410 with bobbin 413, where the second yoke 42 is divided into two end portions 421 and 422 by the winding 420 and bobbin 423.

Referring now to the first stator structure shown in FIG. 4, the A portion represents the position of solenoid coil on the stator yoke, linking the two end portions C of the yoke. Then in the second structure shown in FIG. 5, two coil windings are disposed on the C portions.

According to the empirical design, a formula is established to calculate the coefficient of magnetic loss in the distribution of magnetic flux from the first structure shown in FIG. 4:

$$f = 1 + (L_g/A_g)\{[1.7 U_a \times a/(a+L_g)] + [1.4b(U_b/c)^{1/2} + 0.67 U_c]\} \quad (1)$$

where $L_g$ represents the length of the air gap, $A_g$ represents the cross-sectional area of the air gap, and $U_a$, $U_b$, and $U_c$ respectively represent the circumferences of the A, B and C portions.

Assuming the cross-sectional area of the air gap and A, B, and C portions of the first structure equal to ½ cm×½ cm, and the lengths of the A portion and air gap are 1 cm, and lengths of the B and C portions are 3 cm, then these data are plugged into Equation 1 to produce the magnetic loss as follows:

$$f=1+\{(1.7\times4\times\tfrac{1}{2})+[1.4\times3(\tfrac{4}{3})^{1/2}+0.67\times4]\}=1+10.93=11.93$$

On the contrary, the magnetic loss from the second structure shown in FIG. 5 is derived from the following equation:

$$f=1+(L_g/A_g)\times1.1U_a\times\{[0.67a/(0.67a+L_g)]+(L_g/2a)\} \qquad (2)$$

Using the same conditions as the first structure to plug into Equation 2:

$$f=1+4.4(\tfrac{2}{5}+\tfrac{1}{2})=1+3.96=4.96$$

If the initial magnetic flux on the two structures is 100%, the remaining magnetic flux intensity after passing through the air gap of the first structure is only 8.38% of the initial value; contrarily, the effective magnetic flux intensity through the air gap in the second structure is 20.14%, which is considerably more than that through the first structure.

From these two examples, although magnetic loss or magnetic flux leakage through the poles and yoke in the two-stator structures is inevitable, the result can be quite different if the coil windings are careful arranged on the stator.

Also, it is obvious that the stator yokes 411 and 412 shown in FIG. 3 are not of equal length, so the resulting magnetic flux through the two stator poles are unevenly distributed. The magnetic flux intensity would be adversely affected.

The present invention is aimed to provide a stepper motor with solenoid coils around stator poles which possesses many advantages over the conventional stepper motor.

SUMMARY OF THE INVENTION

An object of the invention is to provide a stepper motor that allows solenoid coils of the motor to be axially mounted on two ends of the yoke, so that the magnetic flux intensity in the reaction area can be strengthened.

Another object of the present invention is to provide a stepper motor that enhances the workability of a stepper motor assembly with automated process.

A further object of the invention is to provide a stepper motor that enables the miniaturization of the stepper motor by reducing the size of stator member and number of turns on the coil winding.

Yet a further object of the invention is to provide a stepper motor that is embedded with a circuit board for controlling the phase switching sequences.

To attain the above-mentioned objects, the present invention provides a stepper motor comprising a plurality of stator members disposed along and spaced from a circumference of a rotor. Each stator member has a yoke whose two end portions point toward the circumference of the rotor and a coil winding is formed around each end portion. The rotor has a plurality of polarity alternating and radially facing poles arranged along the circumference thereof in an equally spaced manner.

In an embodiment of the present invention, two stator members are disposed around the rotor. When the two windings on a first one of the stator members induce magnetic attraction on respective poles of the rotor, the two windings of a second one of the stator members are offset from any rotor poles. When the coil windings are energized and excited, magnetic flux is produced cutting through the two windings and the yoke in the same orientation. The step angle between the two poles on end portion of the stator yoke corresponds to the angle of respective rotor poles which are divided up by odd number magnetic pole pitch.

Since the solenoid coils are axially mounted on two ends of the yoke, the reaction area is drawn closer, boosting the magnetic flux intensity and the motor efficiency. The motor efficiency is concerned with the efficiency for converting magnetic energy into mechanical energy.

If the current design opts to reduce the size of the stepper motor while keeping an equivalent magnetic flux, the turns on the coil winding are reduced, and the current requirement (smaller diameter coils) is also decreased. Using the second structure, it is able to produce a smaller size stepper motor but not affecting the magnetic flux.

The present invention is characterized in that the reaction area of the magnetic field is disposed closer to the end portion of the stators, so that the path of magnetic flux distribution could be shortened. The magnetic flux intensity and holding torque will be improved, if the driving pulses are maintained. Furthermore, the motor efficiency is also enhanced.

The present invention is also characterized in that the yoke structure has two open ends for mounting the solenoid coils, without having to manually wind the coils on the core, so the assembly of the rotor and stator members can be largely automated for cost reduction.

The present invention is also characterized in that the stepper motor is embedded with a circuit board for controlling phase switching sequences, so that the operability and downsizing of the stepper motor can be enhanced.

These along with other features of novelty, which characterize the invention, are pointed out with particularity in the claims annexed to and forming a part of this disclosure. For a better understanding of the invention, the operating advantages and the specific objectives attained by its uses, references should be made to the accompanying drawings and descriptive matter illustrated in preferred embodiments of the invention.

BRIEF DESCRIPTION OF THE DRAWINGS

FIG. 4 schematically shows one stator member construction having a coil winding in a middle section of a yoke;

FIG. 5 schematically shows another stator member construction that has the coil winding on end portions of the yoke;

DETAILED DESCRIPTION OF THE PREFERRED EMBODIMENT

Figure 1:
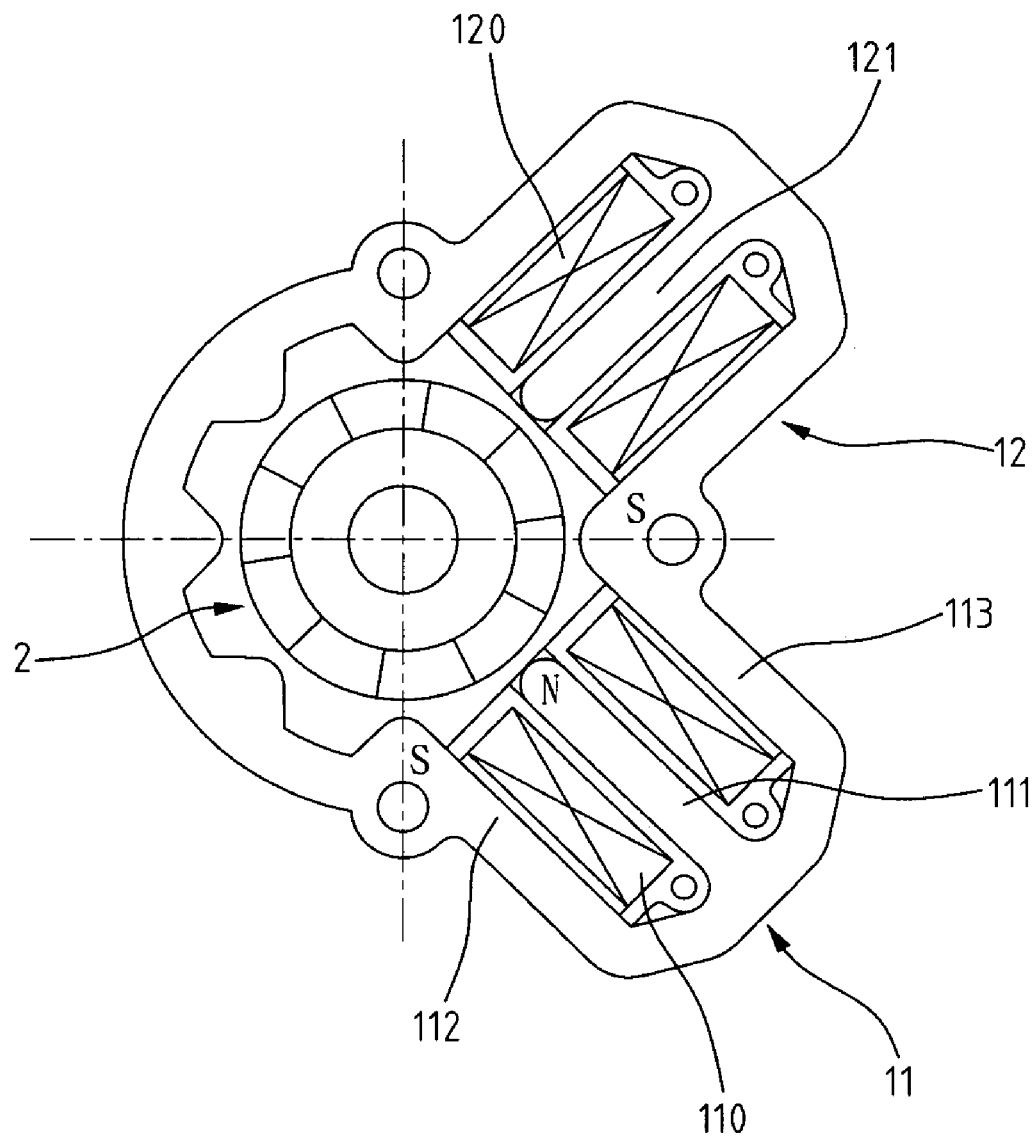
FIG. 1 is a schematic view showing a conventional stepper motor.
Figure 2:
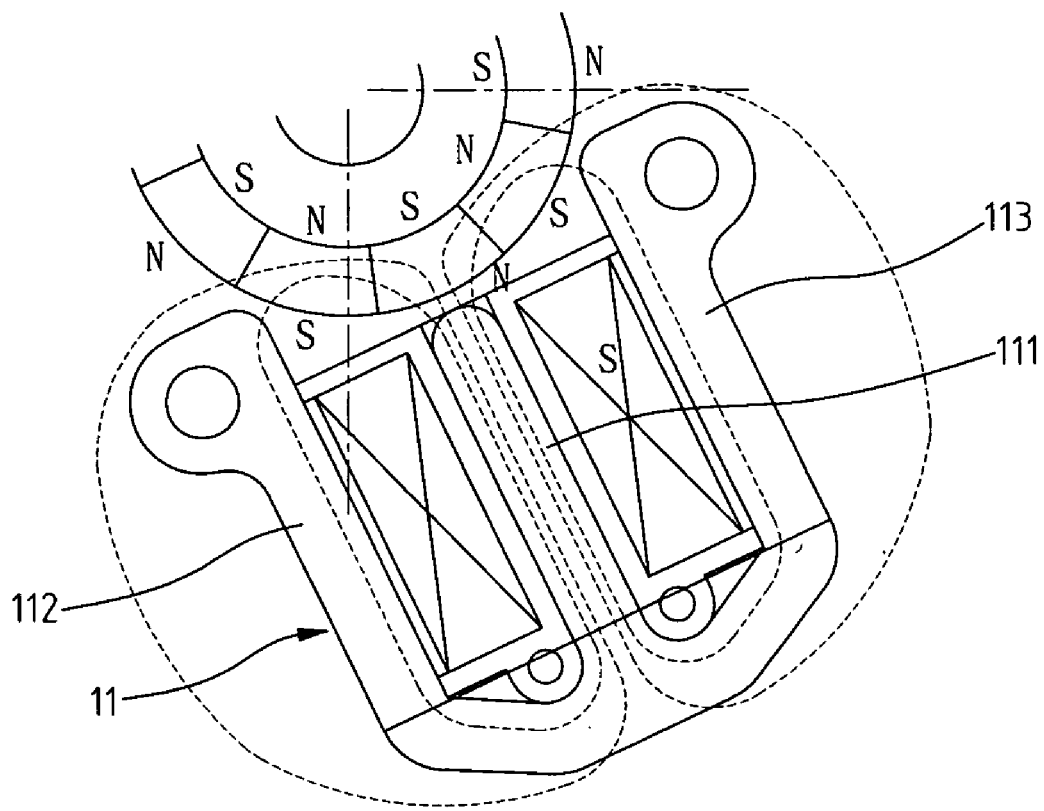
FIG. 2 is an enlarged view of a portion of the conventional stepper motor showing the distribution of magnetic flux through the stator yoke of the stepper motor.
Figure 3:
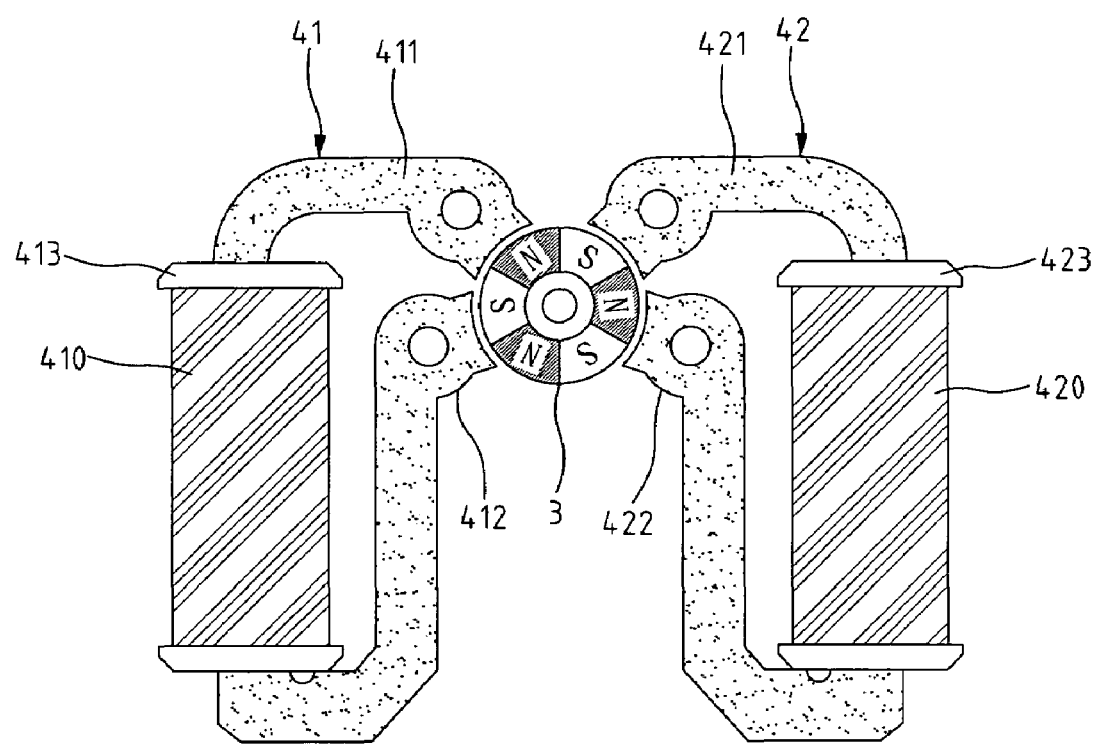
FIG. 3 is a schematic view showing another conventional stepper motor construction.
Figure 6:
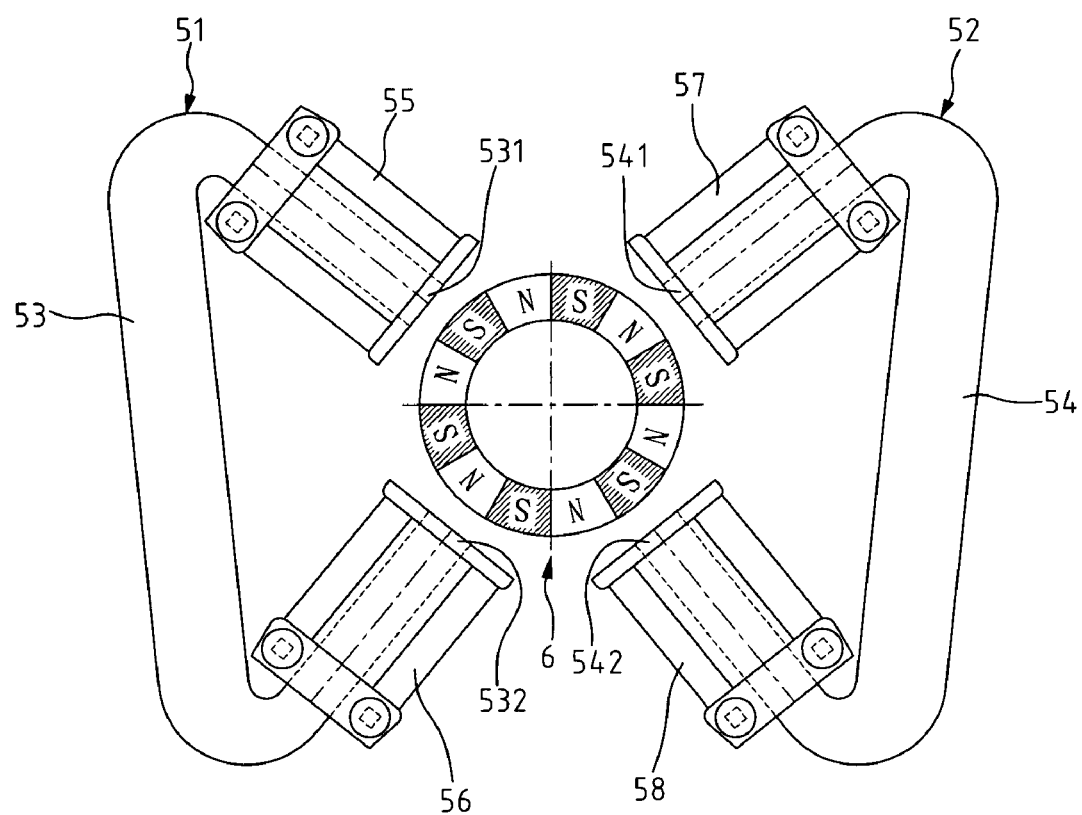
FIG. 6 is a top view of a stepper motor constructed in accordance with the present invention.

With reference to the drawings and in particular to FIG. 6, a stepper motor constructed in accordance with the present invention comprises a rotor, which is generally designated with reference numeral 6 and a stator assembly, which is generally designated with reference numeral 5, comprising a plurality of stator members arranged around the rotor 6 whereby the rotor 6 is rotatable about a central axis of the stator assembly 5.

The rotor 6 is made of permanent magnets arranged as a ring and having a plurality of north and south poles alternating in circumferential direction and facing radially outwards. In the embodiment illustrated, the rotor 6 is constructed with twelve magnetic poles. Thus, each magnetic pole of the rotor 6 takes an angular range (pitch) of approximately 30 degrees, which is equal to 360 degrees divided by 12 (the number of poles).

The stator assembly 5 comprises a plurality of stator members, which in the embodiment illustrated include first and second stator members 51, 52. Each stator member 51, 52 comprises a core or yoke 53, 54 having two limbs (not labeled) extending radially toward the circumference of the rotor 6, each limb having an end portion 531, 532 and 541, 542 adjacent to and spaced from the circumference of the rotor 6 with an end face thereof facing the rotor 6. A coil winding 55, 56, 57, 58 is formed around each end portion 531, 532, 541, 542 of each yoke 53, 54. According to the present invention, each coil winding 55, 56, 57, 58 is pre-formed as a coil, which is then fit over the corresponding end portion of the corresponding stator member in such a manner that an end of the coil winding 55, 56, 57, 58 is substantially flush with the end face of the end portion 531, 532, 541, 542 in order to make the coil winding 55, 56, 57, 58 as close to the circumference of the rotor 6 as possible. Thus, the gap in the radial direction between the coil winding 55, 56, 57, 58 and the rotor 6 is minimized. This, as discussed previously, effectively enhances the operation efficiency of the motor.

Since the coils 55, 56, 57, 58 are wound up in advance and then fit over the end portions 531, 532, 541, 542 of the yokes 53, 54 before the yokes 53, 54 are mounted into the motor or to a circuit board (not shown), even the yokes 53, 54 are of extremely tiny size, the mounting process of the yokes 53, 54 can be performed fluently and efficiently without interference caused by the tiny size of the yokes. This allows for further miniaturization of the motors and simplifies the manufacturing process thereof.

In the embodiment illustrated, the stator members 51, 52 are shaped and sized to have the limbs thereof circumferentially spaced from each other by an angle of approximately 90 degrees, whereby the limbs of the first and second stator members 51, 52 are diametrically opposite to each other. However, it is not necessary to be so. The coil windings 55, 56, 57, 58 can be arranged at any desired angular position about the rotor 6 provided a continuous attractive force can be induced between at least one coil winding 55, 56, 57, 58 and the rotor 6 and a repelling force is induced at another coil winding and the rotor 6 to generate a continuous rotational torque on the rotor 6.

For example and as shown in the drawings, the end portions 531, 532 (and thus the coil windings 55, 56 thereon) of the first stator member 51 is circumferentially spaced by an angle of 90 degrees, which corresponds to the sum of the angular range occupied by three magnetic poles of the rotor 6. In other words, the angular pitch of the magnetic poles of the rotor 6 is 30 degrees as demonstrated previously, and the angular range taken by three magnetic poles is equal to 30 degrees multiplied by three, which is exactly 90 degrees. It is noted that in the embodiment illustrated, the angular space between the coil windings 55, 56 of the first stator member 51 is taken equal to the angular ranged occupied by magnetic poles of odd number, for the rotor 6 in the embodiment illustrated has a total of twelve poles, which is an even number. This ensures that the coil windings 55, 56 of the first stator member 51 are always facing different polarities of the rotor 6. When the coil windings 55, 56 are electrically connected in such a way that the ends of the coil windings 55, 56 facing the rotor 6 are of opposite polarities and magnetic flux flows through the yoke 53 of the first stator member 51, one of the coil windings 55, 56, jumping to the rotor 6 through the gap between the coil winding and the rotor 6, and further through portions of the rotor 6 to reach the position opposing the other coil windings 55, 56 and then jumping back to the coil winding.

The above description is also applicable to the second stator member 52 and thus no further description regarding the second stator member 52 in this respect will be given. However, it is noted that the first and second stator members 51, 52 can be energized or excited differently, to ensure continuous rotation of the rotor 6. This is known to those having ordinary skills and thus no further discussion will be given.

Figure 7:
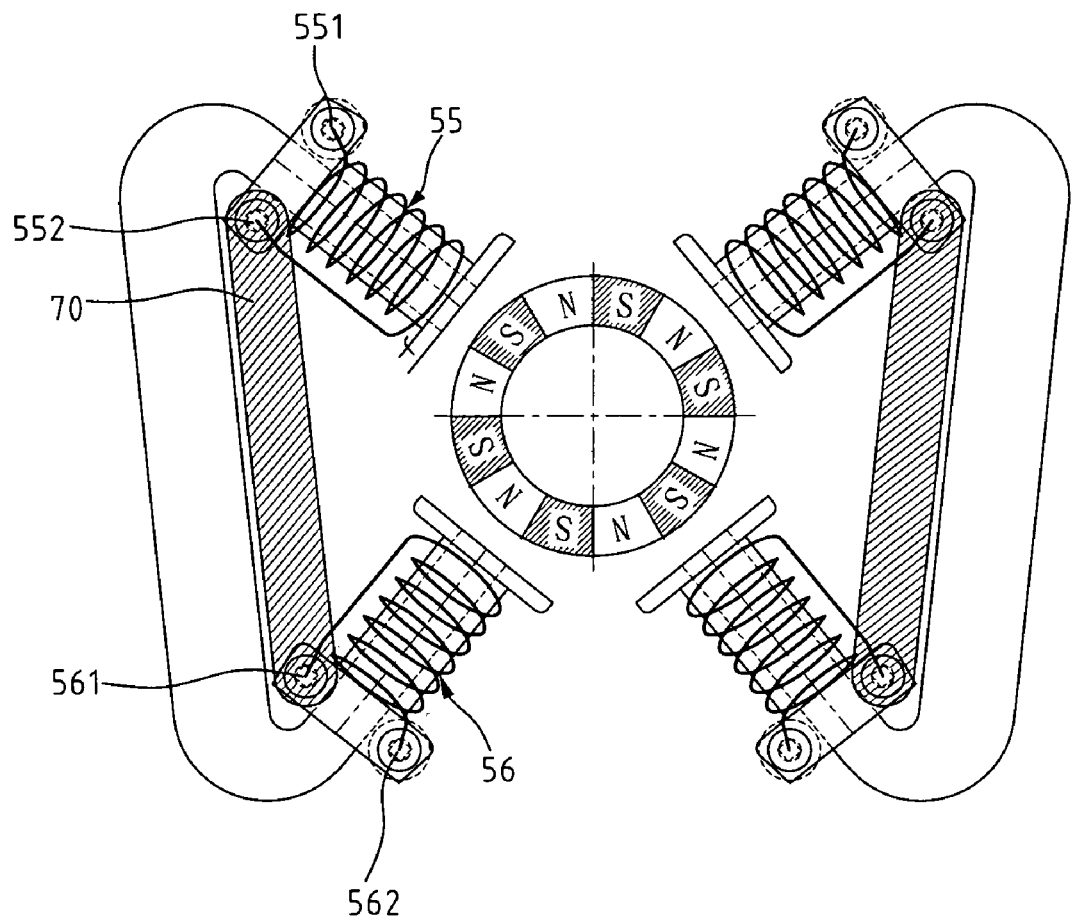
FIG. 7 is similar to FIG. 6 but showing electrical connection between coil windings of the stepper motor and a circuit board.

Also referring to FIG. 7, the rotor 6 and the stator assembly 5 can be arranged on a circuit board 7. The circuit board 7 forms a conductive trace pattern, including conductive traces or strips 70 to which terminals 551, 552, 561, 562 of the coil windings 55, 56 of the first stator member 55 are connected so that the coil windings 55, 56 are electrically connected in such a way that the coil windings 55, 56 can be energized or excited in the manner described above. The second stator member 56 can also be mounted to the circuit board 7 in the same manner and the conductive patterns of the circuit board 7 can be arranged to energize the coil windings 55, 56, 57, 58 in any desired manner. This is known to those having ordinary skills and thus no further detail is needed herein.

Since the coil windings 55, 56, 57, and 58 are wired to the embedded circuit board 7, and the coil windings 55, 56, 57, and 58 are mounted on end portion of the yokes 53, 54, a miniature stepper motor can be designed. If the miniaturization and the automated assembly of the stepper motor are combined, substantial cost reduction can be realized.

Figure 8:
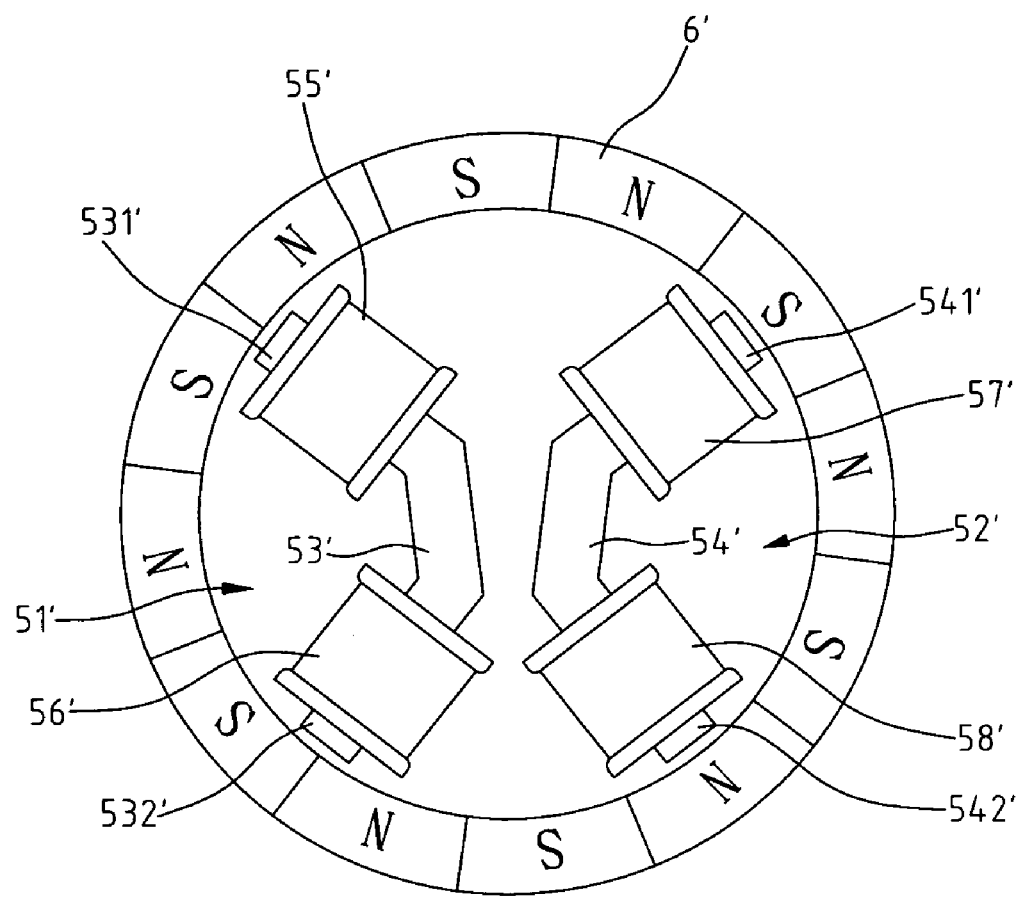
FIG. 8 a top view schematically showing the spatial relationship between rotor and stator member of a stepper motor constructed in accordance with another embodiment of the present invention.

It is apparent to those skilled in the art that the present invention is not limited to the above-mentioned construction with the rotor at the core and multiple stator members on the circumference, but the motor construction can also be changed such that the rotor poles are arranged on the circumference, while the stator members are in the center portion as shown in FIG. 8, wherein the coil windings, designated with reference numerals 55', 56', 57' and 58' for distinction, are respectively mounted on the end portions of the yokes 53' and 54' in a similar manner as the previous example. The ring-shaped rotor 6' is mounted on the circumference of the motor surrounding the stator members 51' and 52', which are smaller under the constraint of space in the center portion. The stator poles 531', 532', 541' and 542' on end of the yokes 53' and 54' are disposed to attract moving poles from the inner he rotor 6'.

The stepper motor of the present invention constructed with the coils wound around end portions of stator poles possesses many advantages over the prior art, such as no magnetic loss, enhanced magnetic flux intensity in the reaction area, and automated assembly of the stepper motor.

Although the present invention has been described with reference to the preferred embodiments thereof, it is apparent to those skilled in the art that a variety of modifications and changes may be made with regard to different forms and shapes without departing from the spirit and scope of the present invention which is intended to be defined by the appended claims.

What is claimed is:

1. A stepper motor, comprising:
   a rotor having a plurality of poles arranged radially and equally spaced around the circumference of the rotor, the plurality of poles being magnetized in alternating polarities; and
   a stator assembly comprising a plurality of stator members, each comprising a yoke and two coil windings, the yoke having two end portions pointing toward the rotor with an odd number of the poles therebetween, the two coil windings being wound around the two end portions of the yoke, respectively;
   wherein a magnetic flux produced by the two coil windings of each stator members substantially circulates through the yoke and the rotor.

2. The stepper motor as claimed in claim 1, wherein the two coil windings of each stator members are flushed with the two end portions of the yoke respectively.

3. The stepper motor as claimed in claim 1, wherein the rotor is positioned among the plurality of stator members.

4. The stepper motor as claimed in claim 1, wherein the rotor has a ring-shaped body encircling the plurality of stator members inside.

5. An electronic device comprising:
   a stepper motor comprising
      a rotor having a plurality of poles arranged radially and equally spaced around the circumference of the rotor, the plurality of poles being magnetized in alternating polarities; and
      a stator assembly comprising a plurality of stator members, each comprising a yoke and two coil windings, the yoke having two end portions pointing toward the rotor with an odd number of the poles therebetween, the two coil windings being wound around the two end portions of the yoke, respectively, each coil winding having two terminals; and
   one circuit board comprising a layout of conductive pattern and a plurality of contact strips electrically extended from the conductive pattern, where the terminals of the coil windings are electrically connected to the contact strips to have the two coil windings of each stator member serially connected.

* * * * *